UNITED STATES PATENT OFFICE.

GEORGE M. MOWBRAY, OF NORTH ADAMS, MASSACHUSETTS.

IMPROVEMENT IN PRIMINGS FOR ELECTRIC FUSES, &c.

Specification forming part of Letters Patent No. 161,431, dated March 30, 1875; application filed March 19, 1873.

CASE B.

*To all whom it may concern:*

Be it known that I, GEORGE M. MOWBRAY, of North Adams, in the county of Berkshire and State of Massachusetts, have invented an Improved Priming for Electric Fuses, &c., of which the following is a specification:

The nature of my invention is a composition of matter, being a mixture of the double salt mercuric fulminate of bismuth with an amalgam of mercury and bismuth, to be used as a priming for electric fuses.

I take mercuric fulminate, by weight, one part; fine metallic bismuth filings, from one to four parts, also by weight; distilled water, sufficient to cover to the depth of half an inch. The fulminate, the bismuth filings, and the water are introduced into a porcelain crucible, and frequently agitated during forty-eight hours, being kept at a temperature of about 70° Fahrenheit. The mass seems to aggregate into a cake, especially at the edges, and this should be broken up and stirred with an ivory spatula. In about forty-eight hours, the mixture will have become a pasty mass, and it should be then very carefully dried in a current of dry air, warmed, and may then be introduced between the terminals of insulated wires, as is usual in making electric fuses, and so secured that the passage of a spark between the terminals may not disperse the priming. It is then hermetically sealed. For blasting purposes, when an electric spark, either from a friction-battery or from an induction-coil, is passed through the priming, between the terminals of the wires, it will instantly explode.

It is perfectly safe to manipulate, and is less sensitive than the preparation made with cadmium in place of the bismuth, and therefore less liable to occasion accidents.

Without limiting myself to the precise proportions of the several ingredients,

I claim—

The above-described composition of bismuth and fulminate of mercury, as a priming for electric fuses, percussion-fuses for shells, &c.

GEORGE M. MOWBRAY.

Witnesses:
W. H. GRISWOLD,
WM. K. BARLOW.